US010452925B2

(12) United States Patent
Yu et al.

(10) Patent No.: US 10,452,925 B2
(45) Date of Patent: Oct. 22, 2019

(54) VIDEO MONITORING METHOD AND VIDEO MONITORING DEVICE

(71) Applicants: BEIJING KUANGSHI TECHNOLOGY CO., LTD., Beijing (CN); MEGVII (BEIJING) TECHNOLOGY CO., LTD., Beijing (CN)

(72) Inventors: Gang Yu, Beijing (CN); Chao Li, Beijing (CN); Qizheng He, Beijing (CN); Muge Chen, Beijing (CN); Yuxiang Peng, Beijing (CN); Qi Yin, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

( * ) Notice: Subject to any disclaimer, the term of this patent is extended or adjusted under 35 U.S.C. 154(b) by 184 days.

(21) Appl. No.: 15/624,264

(22) Filed: Jun. 15, 2017

(65) Prior Publication Data
US 2018/0005047 A1    Jan. 4, 2018

(30) Foreign Application Priority Data
Jun. 30, 2016    (CN) .......................... 2016 1 0513552

(51) Int. Cl.
*G06K 9/00*   (2006.01)
*G06K 9/46*   (2006.01)
(Continued)

(52) U.S. Cl.
CPC ....... *G06K 9/00778* (2013.01); *G06K 9/4628* (2013.01); *G06K 9/6271* (2013.01);
(Continued)

(58) Field of Classification Search
CPC ............. G06K 9/00778; G06K 9/4628; G06K 9/6271; G06K 9/66; G06T 7/194; G06T 5/002; G06N 3/04; G06N 3/08
See application file for complete search history.

(56) References Cited

U.S. PATENT DOCUMENTS

| 2009/0222388 | A1* | 9/2009 | Hua ......................... G06N 5/02 706/12 |
| 2011/0050703 | A1* | 3/2011 | Artan ....................... G06T 7/11 345/440 |

(Continued)

OTHER PUBLICATIONS

Zhang et al, "Single-Image Crowd Counting via Multi-Column Convolutional Neural Network," Jun. 27, 2016, The IEEE Conference on Computer Vision and Pattern Recognition (CVPR), pp. 589-597 (Year: 2016).*

*Primary Examiner* — David F Dunphy
(74) *Attorney, Agent, or Firm* — Hamre, Schumann, Mueller & Larson, P.C.

(57) ABSTRACT

This application provides a video monitoring method and device. The video monitoring method includes: obtaining video data; inputting at least one frame in the video data into a first neural network to determine object amount information of each pixel dot in the at least one frame; and executing at least one of the following operations by using a second neural network: performing a smoothing operation based on the object amount information in the at least one frame to rectify the object amount information; determining object density information of each pixel dot in the at least one frame based on scene information and the object amount information; predicting object density information of each pixel dot in a to-be-predicted frame next to the at least one frame based on the scene information, the object amount information, and association information between the at least one frame and the to-be-predicted frame.

20 Claims, 9 Drawing Sheets

(51) Int. Cl.
  *G06K 9/66* (2006.01)
  *G06T 5/00* (2006.01)
  *G06T 7/194* (2017.01)
  *G06N 3/04* (2006.01)
  *G06N 3/08* (2006.01)
  *G06K 9/62* (2006.01)

(52) U.S. Cl.
  CPC ............ *G06K 9/66* (2013.01); *G06N 3/04* (2013.01); *G06N 3/0445* (2013.01); *G06N 3/0454* (2013.01); *G06N 3/08* (2013.01); *G06T 5/002* (2013.01); *G06T 7/194* (2017.01); *G06T 2207/10016* (2013.01); *G06T 2207/20032* (2013.01); *G06T 2207/20081* (2013.01); *G06T 2207/20084* (2013.01); *G06T 2207/20192* (2013.01)

(56) References Cited

U.S. PATENT DOCUMENTS

2017/0109625 A1* 4/2017 Dai .................... G06N 3/08
2017/0351924 A1* 12/2017 Hotta .................. H04N 7/18

\* cited by examiner

VIDEO MONITORING METHOD AND VIDEO MONITORING DEVICE

CROSS-REFERENCE TO RELATED APPLICATION

This application claims priority to Chinese patent application No. 201610513552.1 filed on Jun. 30, 2016, the entire contents of which are incorporated herein by reference.

TECHNICAL FIELD

The present disclosure relates to the field of video monitoring, and more particularly, to a video monitoring method and a video monitoring device employing the video monitoring method.

BACKGROUND

As monitoring cameras get increasingly popular, requirements of performing security monitoring on important scenes through cameras also become more and more ubiquitous. The most urgent one among security monitoring requirements is monitoring and warning with regard to abnormal accumulation of people. If a density of people flow in a scene is too high, there is a risk of occurrence of dangerous accidents such as stampede. Thus, monitoring and predicting with regard to people density and crowd flow in a monitoring scene has quite important application value for city security.

Traditional security monitoring mainly monitors each camera manually, but with exponential growth of an amount of cameras, it will consume a lot of human resources. In addition, artificial determination criteria may depend on subjective experience, it is impossible to accurately quantify a current congestion degree and thereby make a right decision. Therefore, automatically determining a congestion degree in each scene by a machine intelligence system has very high value. However, traditional crowd congestion determining algorithms often are subjected to specific scenes and depend on view angle transformation in specific scenes as well as background modeling and geometry information in scenes. When it needs to replace a scene, re-adaptation is needed, so a monitoring model trained for specific scenes has no extendibility.

SUMMARY

The present disclosure is provided in view of the above problems. The present disclosure provides a video monitoring method and a video monitoring device employing the video monitoring method. Through a concept based on pedestrian detecting, quantified density estimation is performed for each position in a scene, crowd density estimation at a current moment and crowd density determination in the future are performed by using a feedback neural network and in combination with timing information.

According to an embodiment of the present disclosure, there is provided a video monitoring method, comprising: obtaining video data acquired by a video data acquiring module in an acquisition scene; inputting at least one frame in the video data into a first neural network that is trained in advance, so as to determine object amount information of each pixel dot in the at least one frame; and executing at least one of the following operations by using a second neural network that is trained in advance: performing a smoothing operation based on the object amount information in the at least one frame so as to rectify the object amount information; determining object density information of each pixel dot in the at least one frame based on scene information of the acquisition scene for the video data and the object amount information in the at least one frame; predicting object density information of each pixel dot in a to-be-predicted frame next to the at least one frame based on the scene information of the acquisition scene for the video data, the object amount information in the at least one frame, and association information between the at least one frame and the to-be-predicted frame.

In addition, the video monitoring method according to an embodiment of the present disclosure further comprises training the first neural network, wherein training the first neural network comprises: as for at least one frame in video data in each acquisition scene among a plurality of acquisition scenes, marking training objects as existed in the at least one frame by using a marking box with a predetermined shape, marked video data being regarded as first training data, a concentration of each pixel dot in the first training data indicating an amount of training objects as existed at each pixel dot, inputting each frame of the first training data into a convolution neural network, outputting an amount of the training objects at each pixel dot in each frame of the first training data; and calculating a first loss function based on an amount of the outputted training objects and an amount of the marked training objects, and adjusting parameters of the convolution neural network according to the first loss function so as to obtain the first neural network that is trained.

In addition, the video monitoring method according to an embodiment of the present disclosure further comprises: training the second neural network, wherein training the second neural network comprises: as for at least one frame in video data in each acquisition scene among a plurality of acquisition scenes, regarding video data in which an amount of training objects as existed in the at least one frame is marked as second training data, marking a density of training objects of each pixel dot in the second training data according to scene information of each acquisition scene; inputting each frame of the second training data into the second neural network, and outputting a density of training objects of each pixel dot in each frame of the second training data according to an amount of training objects at each pixel dot in a previous frame before each frame and the scene information of each acquisition scene; calculating a second loss function according to a density of training objects outputted in each frame and a density of marked training objects in a corresponding frame in the second training data; and adjusting parameters of the second neural network according to the second loss function, so as to obtain the second neural network that is trained.

In addition, the video monitoring method according to an embodiment of the present disclosure further comprises: training the second neural network, wherein training the second neural network comprises: as for at least one frame in video data in each acquisition scene among a plurality of acquisition scenes, regarding video data in which an amount of training objects as existed in the at least one frame is marked as third training data, marking a density of training objects of each pixel dot in the third training data according to scene information of each acquisition scene; inputting each frame of the third training data into the second neural network, and outputting a density of training objects of each pixel dot in a to-be-predicted frame next to each frame of the third training data according to an amount of training objects at each pixel dot in a previous frame before each frame and the scene information of each acquisition scene, calculating a third loss function according to a density of training objects outputted for each pixel dot in the to-be-predicted frame and a density of marked training objects in a corresponding frame in the third training data; and adjusting parameters of the second neural network according to the third loss function, so as to obtain the second neural network that is trained.

In addition, in the video monitoring method according to an embodiment of the present disclosure, wherein inputting at least one frame in the video data into a first neural network that is trained in advance, so as to determine object amount information of each pixel dot in the at least one frame comprises: determining foreground data and background data in the at least one frame in the video data based on a predetermined model or a predetermined algorithm; and inputting the foreground data into the first neural network, to thereby determine object amount information at each pixel dot in the foreground data.

In addition, in the video monitoring method according to an embodiment of the present disclosure, wherein the at least one frame is all of image frames in the video data; or, the at least one frame is parts of image frames in the video data, and when an amount of the at least one frame is larger than 3, a time interval between respective adjacent frames is equal.

In addition, in the video monitoring method according to an embodiment of the present disclosure, wherein the object amount information in the at least one frame, based on which the operation of determining object density information of each pixel dot in the at least one frame is performed, is rectified object amount information obtained by performing a smoothing operation; and/or the object amount information in the at least one frame, based on which the operation of predicting object density information of each pixel dot in the to-be-predicted frame is performed, is rectified object amount information obtained by performing a smoothing operation.

In addition, the video monitoring method according to an embodiment of the present disclosure further comprises: generating alert information when the object density information of the at least one frame or the to-be-predicted frame next to the at least one frame indicates that an object density exceeds a predetermined threshold.

According to another embodiment of the present disclosure, there is provided a video monitoring device, comprising: a video data acquiring module for acquiring video data in an acquisition scene; an amount determining module for inputting at least one frame in the video data into a first neural network that is trained in advance, so as to determine object amount information of each pixel dot in the at least one frame; and a density determining module for executing at least one of the following operations by using a second neural network that is trained in advance: performing a smoothing operation based on the object amount information in the at least one frame so as to rectify the object amount information; determining object density information of each pixel dot in the at least one frame based on scene information of the acquisition scene for the video data and the object amount information in the at least one frame; and predicting object density information of each pixel dot in a to-be-predicted frame next to the at least one frame based on the scene information of the acquisition scene for the video data, the object amount information in the at least one frame, and temporal relationship information between the at least one frame and the to-be-predicted frame.

In addition, the video monitoring device according to another embodiment of the present disclosure further comprises a first training module for training the first neural network in advance, wherein as for at least one frame in video data in each acquisition scene among a plurality of acquisition scenes, training objects as existed in the at least one frame are marked by using a marking box with a predetermined shape, marked video data is regarded as first training data, a concentration of each pixel dot in the first training data indicates an amount of training objects as existed at each pixel dot, the first training module inputs each frame of the first training data into a convolution neural network, an amount of the training objects at each pixel dot in each frame of the first training data is outputted; the first training module calculates a first loss function based on an amount of the outputted training objects and an amount of the marked training objects, and adjusts parameters of the convolution neural network according to the first loss function so as to obtain the first neural network that is trained.

In addition, the video monitoring device according to another embodiment of the present disclosure further comprises a second training module for training the second neural network, wherein as for at least one frame in video data in each acquisition scene among a plurality of acquisition scenes, video data in which an amount of training objects as existed in the at least one frame is marked is regarded as second training data, a density of each pixel dot in the second training data is marked according to scene information of each acquisition scene, the second training module inputs each frame of the second training data into the second neural network, and a density of training objects of each pixel dot in each frame of the second training data is outputted according to an amount of training objects at each pixel dot in a previous frame before each frame and the scene information of each acquisition scene, the second training module calculates a second loss function according to a density of training objects outputted in each frame and a density of marked training objects in a corresponding frame in the second training data, and adjusts parameters of the second neural network according to the second loss function, so as to obtain the second neural network that is trained.

In addition, the video monitoring device according to another embodiment of the present disclosure further comprises a third training module for training the second neural network, wherein as for at least one frame in video data in each acquisition scene among a plurality of acquisition scenes, video data in which an amount of training objects as existed in the at least one frame is marked is regarded as third training data, a density of each pixel dot in the third training data is marked according to scene information of each acquisition scene, the third training module inputs each frame of the third training data into the second neural network, and a density of training objects of each pixel dot in a to-be-predicted frame next to each frame of the third training data is outputted according to an amount of training objects at each pixel dot in a previous frame before each frame and the scene information of each acquisition scene, the third training module calculates a third loss function according to a density of training objects outputted for each pixel dot in the to-be-predicted frame and a density of marked training objects in a corresponding frame in the third training data, and adjusts parameters of the second neural network according to the third loss function, so as to obtain the second neural network that is trained.

In addition, in the video monitoring device according to another embodiment of the present disclosure, wherein the amount determining module determines foreground data and background data in the at least one frame in the video data based on a predetermined model or a predetermined algorithm, and inputs the foreground data into the first neural network, to thereby determine object amount information at each pixel dot in the foreground data.

In addition, in the video monitoring device according to another embodiment of the present disclosure, wherein the at least one frame is all of image frames in the video data; or, the at least one frame is parts of image frames in the video data, and when an amount of the at least one frame is larger than 3, a time interval between respective adjacent frames is equal.

In addition, in the video monitoring device according to another embodiment of the present disclosure, wherein the object amount information in the at least one frame based on which the density determining module performs the operation of determining object density information of each pixel dot in the at least one frame, is rectified object amount information obtained by performing a smoothing operation; and/or the object amount information in the at least one frame based on which the density determining module performs the operation of predicting object density information of each pixel dot in the to-be-predicted frame, is rectified object amount information obtained by performing a smoothing operation.

In addition, the video monitoring device according to another embodiment of the present disclosure further comprises an information generating module for generating alert information when the object density information of the at least one frame or the to-be-predicted frame next to the at least one frame indicates that an object density exceeds a predetermined threshold.

According to yet another embodiment of the present disclosure, there is provided a computer program product, comprising a computer-readable medium on which computer program instructions configured to execute the following steps when being run by a computer are stored:

obtaining video data acquired by a video data acquiring module; inputting at least one frame in the video data into a first neural network that is trained in advance, so as to determine object amount information of each pixel dot in the at least one frame; and executing at least one of the following operations by using a second neural network that is trained in advance: performing a smoothing operation based on the object amount information in the at least one frame so as to rectify the object amount information; determining object density information of each pixel dot in the at least one frame based on scene information of the acquisition scene for the video data and the object amount information in the at least one frame; predicting object density information of each pixel dot in a to-be-predicted frame next to the at least one frame based on the scene information of the acquisition scene for the video data, the object amount information in the at least one frame, and association information between the at least one frame and the to-be-predicted frame.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should fall into the protection scope of the present disclosure.

Hereinafter, the embodiments of the present disclosure will be described in detail with reference to the accompanying drawings.

Figure 1:
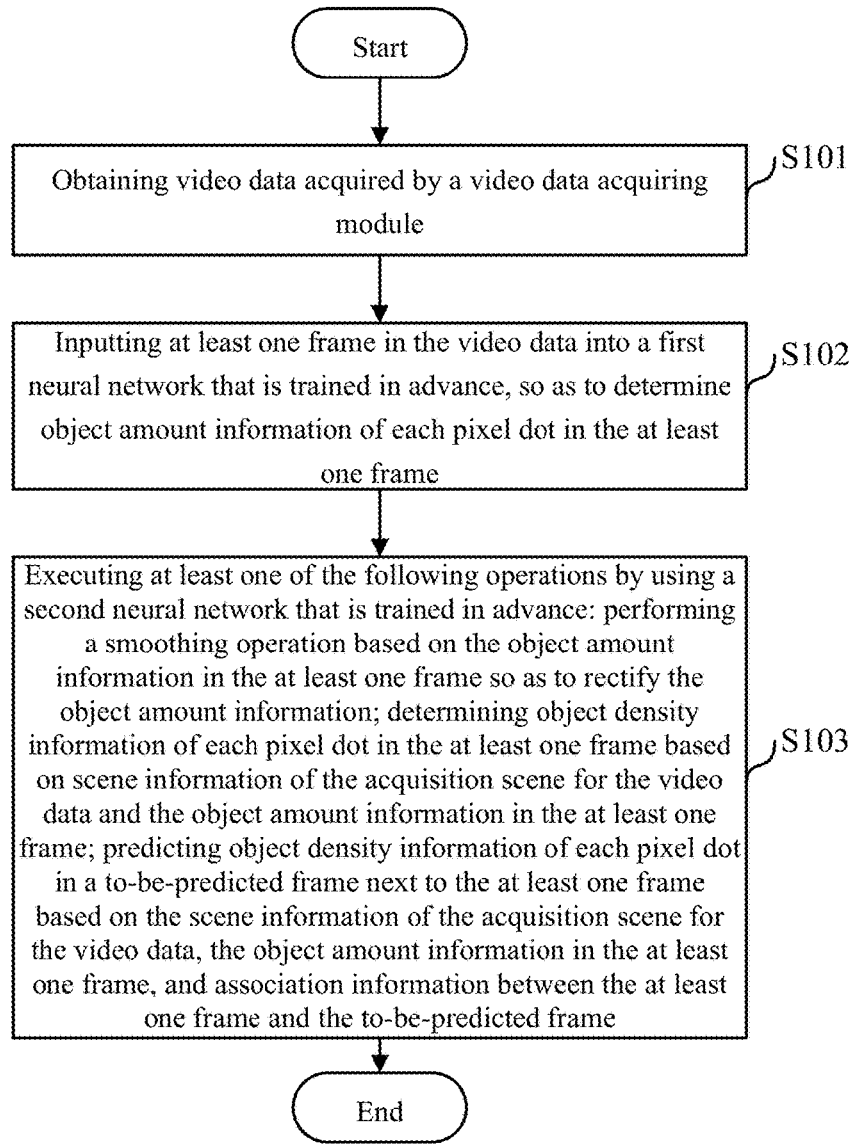
FIG. 1 is a flowchart briefly illustrating the video monitoring method according to an embodiment of the present disclosure.

FIG. 1 is a flowchart briefly illustrating the video monitoring method according to an embodiment of the present disclosure. As shown in FIG. 1, the video monitoring method according to an embodiment of the present disclosure comprises the following steps.

In step S101, video data acquired by a video data acquiring module is obtained. In an embodiment of the present disclosure, a monitoring camera (such as an RGB camera or a depth camera) capable of acquiring video data in a video monitoring scene may be configured in the video monitoring scene as the video data acquiring module, the monitoring camera may monitor a current scene with a certain overhead view angle. Obtaining video data acquired by a video data acquiring module includes, but not limited to, after video data is acquired by a video data acquiring module disposed physically separated, receiving video data transmitted from the video data acquiring module via a wired or wireless manner. Alternatively, the video data acquiring module may be located on the same position or even within the same housing with other modules or components in the video monitoring device, said other modules or components in the video monitoring device receive video data transmitted from the video data acquiring module via an internal bus. Thereafter, the processing proceeds to step S102.

In step S102, at least one frame in the video data is inputted into a first neural network that is trained in advance, so as to determine object amount information of each pixel dot in the at least one frame.

In an embodiment of the present disclosure, the first neural network is a Convolution Neural Network (CNN). Training is performed in advance based on a certain number of training data to obtain an object amount model based on a pixel level. Hereinafter, marking the training data and corresponding training process will be further described in detail with reference to the drawings.

More specifically, in an embodiment of the present disclosure, after inputting at least one frame in the video data into a first neural network that is trained in advance, foreground data and background data in the at least one frame may be determined based on a predetermined model. For example, probability estimation may be performed on each pixel dot in a region being monitored based on a predetermined model, to obtain a probability model for each pixel dot. In an embodiment of the present disclosure, a Multi-Gaussian model is used to perform probability estimation on a single pixel dot, and with this model, foreground data and background data are determined for the acquired video data. After a scene for being monitored is configured, the probability model is a probability that the video data is the background data. Since background is relatively fixed, foreground is arbitrary, thus features extracted from pixels that are different from the background data are the foreground data.

Alternatively, in a case where the video data includes depth information, foreground data and background data in the at least one frame may be determined based on a predetermined algorithm. Specifically, the predetermined algorithm includes acquiring a depth information difference between current pixel information of each pixel dot of the video data and corresponding background depth information, determining a region that includes pixel dots whose depth information difference is larger than a first predetermined threshold as a foreground candidate region, and performing median filtering on video data in the foreground candidate region to obtain video data of a foreground region for monitoring. By means of performing median filtering on the video data in the foreground candidate region, an edge of signals can be protected while filtering noise signals, so that the foreground region is not blurred.

After determining the foreground data as described above, the foreground data is inputted to the first neural network, so as to determine object amount information of each pixel dot in the foreground data. In this way, it can greatly reduce required computations, and avoid obtaining a wrong estimated value for determination on a ground.

In an embodiment of the present disclosure, in order to further improve real-time responding of video monitoring, an amount of objects may be determined in a manner of sampling based on spaced frames. Since multiple frames of video data do not always change much, a sampling operation based on spaced frames (for example, every 5 frames) may be employed. That is, the at least one frame may be all of image frames in the video data, in this case, a sampling operation based on continuous frames is performed; or, the at least one frame may be parts of image frames in the video data, in this case, a sampling operation based on spaced frames is performed, and when an amount of the at least one frame is larger than 3, a time interval between respective adjacent frames is equal, i.e., the sampling operation based on spaced frames is performed with a uniform sampling interval.

After acquiring object amount information of each pixel dot in a single frame at step S102, the processing proceeds to step S103.

In step S103, at least one of the following operations is executed by using a second neural network that is trained in advance: performing a smoothing operation based on the object amount information in the at least one frame so as to rectify the object amount information; determining object density information of each pixel dot in the at least one frame based on scene information of the acquisition scene for the video data and the object amount information in the at least one frame; predicting object density information of each pixel dot in a to-be-predicted frame next to the at least one frame based on the scene information of the acquisition scene for the video data, the object amount information in the at least one frame, and temporal relationship information between the at least one frame and the to-be-predicted frame.

In an embodiment of the present disclosure, the second neural network is a Recurrent neural network (RNN). Similar to the training of the first neural network, corresponding training process is performed in advance based on a certain number of training data and according to a monitoring aim of the second neural network. Hereinafter, marking the training data and corresponding training process will be further described in detail with reference to the drawings.

More specifically, in an embodiment of the present disclosure, after the second neural network receives object amount information of each pixel dot in the at least frame as inputted from the first neural network, a smoothing operation may be performed on an outputs of respective positions in the at least one frame, so as to obtain rectified object amount information.

Further, in an embodiment of the present disclosure, after the second neural network receives object amount information of each pixel dot in the at least frame as inputted from the first neural network, object density information of each pixel dot in the at least one frame may be further determined based on scene information (e.g., physical geometry information of a scene, a view angle of a monitoring camera, a physical focal length, and other information) of the acquisition scene for the video data and from the object amount information. In an embodiment, a density of training objects of each pixel dot may be obtained by multiplying an amount of training objects in a corresponding pixel dot with scene information of a scene where the pixel dot resides. Alternatively, the object amount information used when determining the object density information may be the rectified object amount information which is obtained after performing a smoothing operation on outputs of respective positions in the at least one frame.

Further, in an embodiment of the present disclosure, after the second neural network receives object amount information of each pixel dot in the at least frame as inputted from the first neural network, object density information of each pixel dot in a to-be-predicted frame next to the at least one frame may be predicted based on scene information (e.g., physical geometry information of a scene, a view angle of a monitoring camera, a physical focal length, and other information) of the acquisition scene for the video data and association information between the at least one frame and the to-be-predicted frame, and from the object amount information. For example, after object amount information of each pixel dot in a t-th frame is inputted, object density information in a (t+K)-th frame may be predicted, a value of K may be assigned discretely as K=1000, 2000, and so on.

The object density information of the at least one frame or the to-be-predicted frame after the at least one frame at a certain moment as obtained in step S103 may be used for generating alert information. When the object density information of the at least one frame or the to-be-predicted frame after the at least one frame at a certain moment is larger than a predetermined threshold that is set in advance, it is displayed that an object density in the scene is too large, there is a risk of occurrence of dangerous accidents such as stampede, then alert information is generated.

The video monitoring method according to an embodiment of the present disclosure implements crowd density estimation not depending on a scene by means of training in advance a neural network that performs quantized density estimation on each position in a scene. Next, a video monitoring device executing the above video monitoring method will be further described with reference to FIG. 2.

Figure 2:
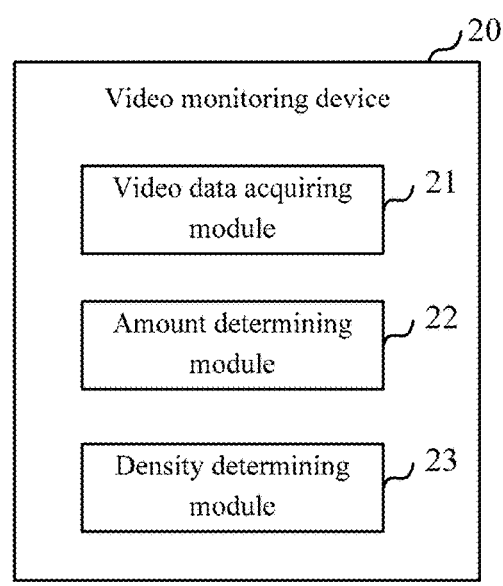
FIG. 2 is a functional block diagram illustrating the video monitoring device according to an embodiment of the present disclosure.

FIG. 2 is a functional block diagram illustrating the video monitoring device according to an embodiment of the present disclosure. As shown in FIG. 2, the video monitoring device 20 according to an embodiment of the present disclosure comprises a video data acquiring module 21, an amount determining module 22, and a density determining module 23.

Specifically, the video data acquiring module 21 is for acquiring video data in an acquisition scene. In an embodiment of the present disclosure, a monitoring camera (such as an RGB camera or a depth camera) capable of acquiring video data in a video monitoring scene may be configured in the video monitoring scene as the video data acquiring module 21, the monitoring camera may monitor a current scene with a certain overhead view angle. The video data acquiring module 21 may be configured physically separated from the subsequent amount determining module 22 and density determining module 23 and so on, and transmit video data from the video data acquiring module 21 to the subsequent respective modules in a wired or wireless manner. Alternatively, the video data acquiring module may be located on the same position or even within the same housing with other modules or components in the video monitoring device 20, said other modules or components in the video monitoring device 20 receive video data transmitted from the video data acquiring module via an internal bus.

The amount determining module 22 is for inputting at least one frame in the video data into a first neural network that is trained in advance, so as to determine object amount information of each pixel dot in the at least one frame. As described above, the first neural network used by the amount determining module 22 is a Convolution Neural Network (CNN). Training is performed in advance based on a certain number of training data to obtain an object amount model based on a pixel level.

The amount determining module 22 determines foreground data and background data in the at least one frame in the video data based on a predetermined model. For example, the amount determining module 22 may perform probability estimation on each pixel dot in a region being monitored based on a predetermined model, to obtain a probability model for each pixel dot. In an embodiment of the present disclosure, a Multi-Gaussian model is used to perform probability estimation on a single pixel dot, and with this model, foreground data and background data are determined for the acquired video data. After a scene for being monitored is configured, the probability model is a probability that the video data is the background data. Since background is relatively fixed, foreground is arbitrary, thus features extracted from pixels that are different from the background data are the foreground data.

Alternatively, in a case where the video data includes depth information, the amount determining module 22 may determine foreground data and background data in the at least one frame based on a predetermined algorithm. Specifically, the predetermined algorithm includes acquiring a depth information difference between current pixel information of each pixel dot of the video data and corresponding background depth information, determining a region that includes pixel dots whose depth information difference is larger than a first predetermined threshold as a foreground candidate region, and performing median filtering on video data in the foreground candidate region to obtain video data of a foreground region for monitoring. By means of performing median filtering on the video data in the foreground candidate region, an edge of signals can be protected while filtering noise signals, so that the foreground region is not blurred. After determining the foreground data as described above, the foreground data is inputted to the first neural network, so as to determine object amount information of each pixel dot in the foreground data. In this way, it can greatly reduce required computations, and avoid obtaining a wrong estimated value for determination on a ground.

In an embodiment of the present disclosure, in order to further improve real-time responding of video monitoring, the amount determining module 22 may determine an amount of objects in a manner of sampling based on spaced frames. Since multiple frames of video data do not always change much, a sampling operation based on spaced frames (for example, every 5 frames) may be employed. That is, the at least one frame may be all of image frames in the video data, in this case, a sampling operation based on continuous frames is performed; or, the at least one frame may be parts of image frames in the video data, in this case, a sampling operation based on spaced frames is performed, and when an amount of the at least one frame is larger than 3, a time interval between respective adjacent frames is equal, i.e., the sampling operation based on spaced frames is performed with a uniform sampling interval.

The density determining module 23 executes at least one of the following operations by using a second neural network that is trained in advance: performing a smoothing operation based on the object amount information in the at least one frame so as to rectify the object amount information; determining object density information of each pixel dot in the at least one frame based on scene information of the acquisition scene for the video data and the object amount information in the at least one frame; and predicting object density information of each pixel dot in a to-be-predicted frame next to the at least one frame based on the scene information of the acquisition scene for the video data, the object amount information in the at least one frame, and temporal relationship information between the at least one frame and the to-be-predicted frame.

In an embodiment of the present disclosure, the second neural network used by the density determining module 23 is a Recurrent neural network (RNN). Similar to the training of the first neural network, corresponding training process is performed in advance based on a certain number of training data and according to a monitoring aim of the second neural network.

More specifically, in an embodiment of the present disclosure, the density determining module 23 may further, after receiving object amount information of each pixel dot in the at least frame as inputted from the amount determining module 22, perform a smoothing operation on an outputs of respective positions in the at least one frame, so as to obtain rectified object amount information.

Further, in an embodiment of the present disclosure, after receiving object amount information of each pixel dot in the at least frame as inputted from the amount determining module 22, the density determining module 23 may further determine object density information of each pixel dot in the at least one frame based on scene information (e.g., physical geometry information of a scene, a view angle of a monitoring camera, a physical focal length, and other information) of the acquisition scene for the video data and from the object amount information. Alternatively, the object amount information used when determining the object density information may be the rectified object amount information which is obtained after performing a smoothing operation on outputs of respective positions in the at least one frame.

Further, in an embodiment of the present disclosure, after receiving object amount information of each pixel dot in the at least frame as inputted from the amount determining module 22, the density determining module 23 may further predict object density information of each pixel dot in a to-be-predicted frame next to the at least one frame based on scene information (e.g., physical geometry information of a scene, a view angle of a monitoring camera, a physical focal length, and other information) of the acquisition scene for the video data and association information between the at least one frame and the to-be-predicted frame, and from the object amount information. For example, after object amount information of each pixel dot in a t-th frame is inputted, object density information in a (t+K)-th frame may be predicted, a value of K may be assigned discretely as K=1000, 2000, and so on.

In the video monitoring device 20 described above, the first neural network used by the amount determining module 22 and the second neural network used by the density determining module 23 need to be trained in advance. Hereinafter, corresponding training process will be described with reference to FIGS. 3 to 6.

Figure 3:
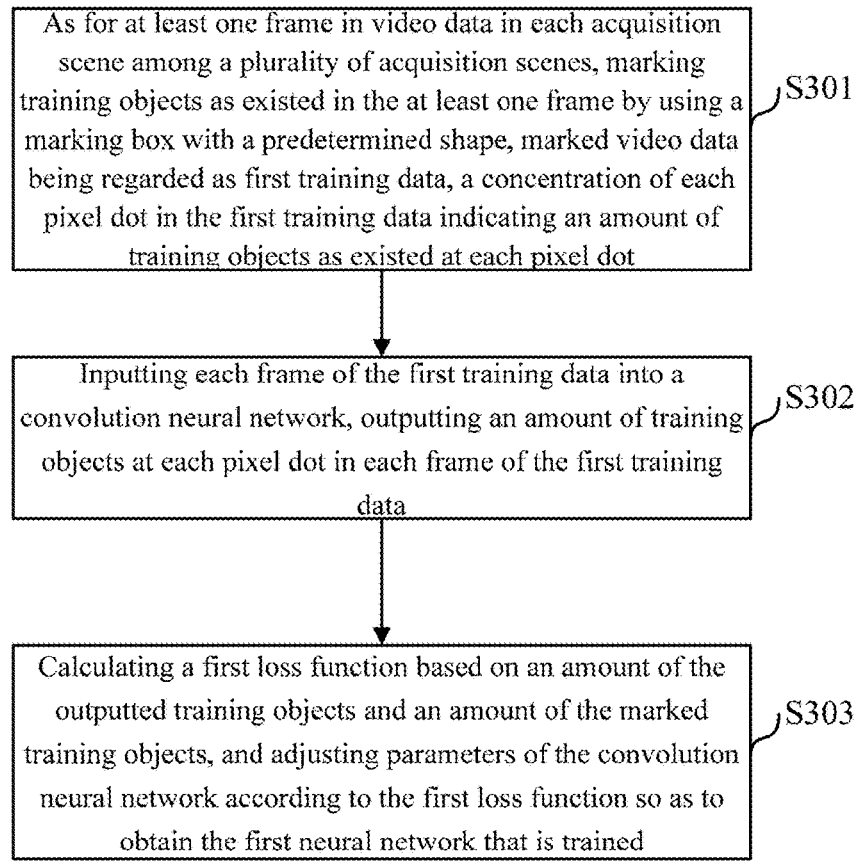
FIG. 3 is a first flowchart further illustrating the processing of training a neural network in the video monitoring method according to an embodiment of the present disclosure.

FIG. 3 is a first flowchart further illustrating the processing of training a neural network in the video monitoring method according to an embodiment of the present disclosure. The first flow of the processing of training a neural network shown in FIG. 3 is for training the first neural network that is for determining object amount information of each pixel dot in at least one frame. The first flow of the processing of training a neural network comprises the following steps.

In step S301, as for at least one frame in video data in each acquisition scene among a plurality of acquisition scenes, training objects as existed in the at least one frame are marked by using a marking box with a predetermined shape, marked video data are regarded as first training data, a concentration of each pixel dot in the first training data indicates an amount of training objects as existed at each pixel dot.

Figure 4:
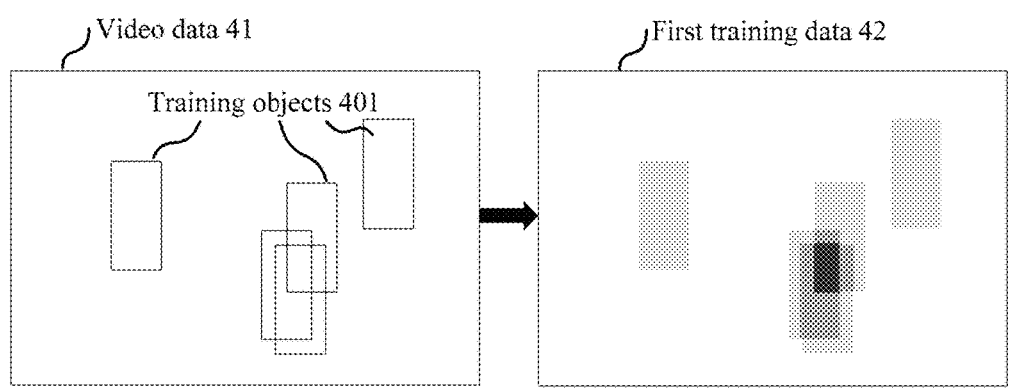
FIG. 4 is a schematic diagram illustrating marking training data in the processing of training a neural network in the video monitoring method according to an embodiment of the present disclosure.

Referring to FIG. 4, FIG. 4 is a schematic diagram illustrating marking training data in the processing of training a neural network in the video monitoring method according to an embodiment of the present disclosure. As shown in FIG. 4, in video data 41 of a scene for training, training objects 401 as existed in the at least one frame are marked by using a marking box with a predetermined shape (e.g., rectangle). Further, marked video data is regarded as first training data 42, wherein a concentration of each pixel dot in the first training data 42 indicates an amount of training objects as existed at each pixel dot. That is to say, as shown in FIG. 4, color of a pixel dot where several training objects 401 are overlapped is deeper than color of a pixel dot where a single training object 401 exists and color of a pixel dot where no training object 401 is marked. And the deeper the color is, it indicates that the more the amount of training objects as existed at this pixel dot is, and the higher the corresponding density is.

Referring back to FIG. 3, after step S301, the processing proceeds to step S302.

In step S302, each frame of the first training data is inputted into a convolution neural network, an amount of the training objects at each pixel dot in each frame of the first training data is outputted. Thereafter, the processing proceeds to step S303.

In step S303, a first loss function is calculated based on an amount of the outputted training objects and an amount of the marked training objects, and parameters of the convolution neural network are adjusted according to the first loss function so as to obtain the first neural network that is trained.

Through the first flow of the processing of training a neural network shown in FIG. 3, by means of repeated iterative training of a large number of training data, the first neural network applicable to the video monitoring device according to an embodiment of the present disclosure is obtained.

Figure 5:
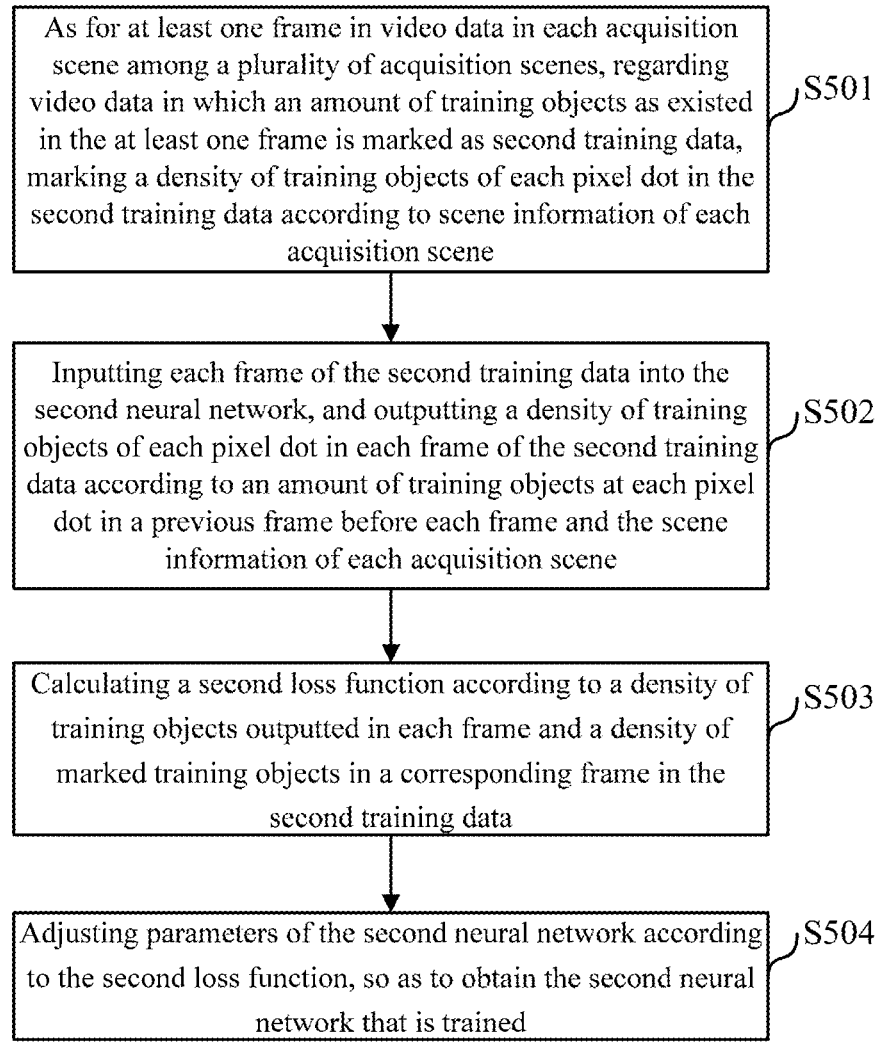
FIG. 5 a second flowchart further illustrating the processing of training a neural network in the video monitoring method according to an embodiment of the present disclosure.

FIG. 5 a second flowchart further illustrating the processing of training a neural network in the video monitoring method according to an embodiment of the present disclosure. The second flow of the processing of training a neural network shown in FIG. 5 is for training the second neural network that is for determining object density information of each pixel dot in the at least one frame from the object amount information. The second flow of the processing of training a neural network comprises the following steps.

In step S501, as for at least one frame in video data in each acquisition scene among a plurality of acquisition scenes, video data in which an amount of training objects as existed in the at least one frame is marked is regarded as second training data, a density of training objects of each pixel dot in the second training data is marked according to scene information of each acquisition scene. In an embodiment of the present disclosure, a density of training objects of each pixel dot may be obtained by multiplying an amount of training objects in a corresponding pixel dot with scene information of a scene where the pixel dot resides, wherein the scene information may be physical geometry information of a scene, a view angle of a monitoring camera, a physical focal length, and other information. Thereafter, the processing proceeds to step S502.

In step S502, each frame of the second training data is inputted into the second neural network, and a density of training objects of each pixel dot in each frame of the second training data is outputted according to an amount of training objects at each pixel dot in a previous frame before each frame and the scene information of each acquisition scene. Thereafter, the processing proceeds to step S503.

In step S503, a second loss function is calculated according to a density of training objects outputted in each frame and a density of marked training objects in a corresponding frame in the second training data. Thereafter, the processing proceeds to step S504.

In step S504, parameters of the second neural network are adjusted according to the second loss function, so as to obtain the second neural network that is trained.

Through the second flow of the processing of training a neural network shown in FIG. 5, by means of repeated iterative training of a large number of training data, the second neural network applicable to the video monitoring device according to an embodiment of the present disclosure is obtained, and the second neural network is for determining object density information of each pixel dot in the at least one frame from the object amount information.

Figure 6:
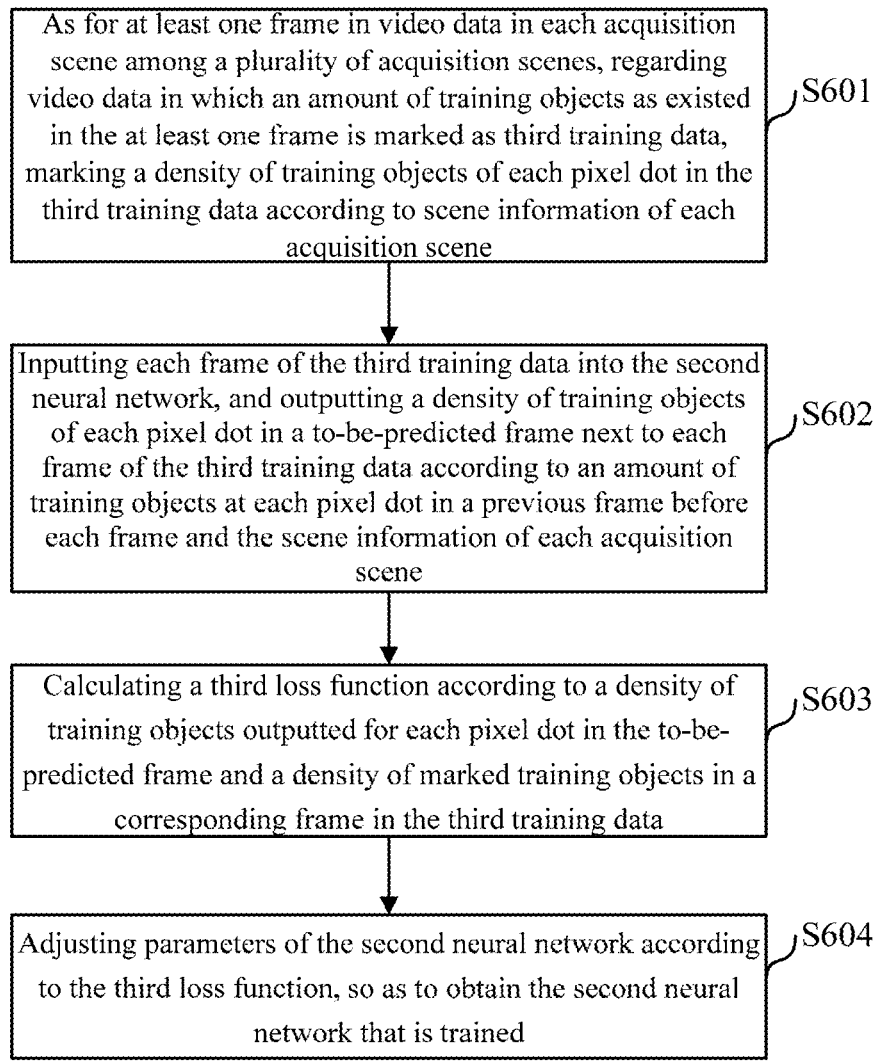
FIG. 6 a third flowchart further illustrating the processing of training a neural network in the video monitoring method according to an embodiment of the present disclosure.

FIG. 6 a third flowchart further illustrating the processing of training a neural network in the video monitoring method according to an embodiment of the present disclosure. The third flow of the processing of training a neural network shown in FIG. 6 is for training the second neural network for determining, from the object amount information, object density information of each pixel dot in a to-be-predicted frame next to the at least one frame as outputted from the first neural network. The third flow of the processing of training a neural network comprises the following steps.

In step S601, as for at least one frame in video data in each acquisition scene among a plurality of acquisition scenes, video data in which an amount of training objects as existed in the at least one frame is marked is regarded as third training data, a density of training objects of each pixel dot in the third training data is marked according to scene information of each acquisition scene. Thereafter, the processing proceeds to step S602.

In step S602, each frame of the third training data is inputted into the second neural network, and a density of training objects of each pixel dot in a to-be-predicted frame next to each frame of the third training data is outputted according to an amount of training objects at each pixel dot in a previous frame before each frame and the scene information of each acquisition scene. Thereafter, the processing proceeds to step S603.

In step S603, a third loss function is calculated according to a density of training objects outputted for each pixel dot in the to-be-predicted frame and a density of marked training objects in a corresponding frame in the third training data. Thereafter, the processing proceeds to step S604.

In step S604, parameters of the second neural network are adjusted according to the third loss function, so as to obtain the second neural network that is trained.

Through the third flow of the processing of training a neural network shown in FIG. 6, by means of repeated iterative training of a large number of training data, the second neural network applicable to the video monitoring device according to an embodiment of the present disclosure is obtained, and the second neural network is for determining object density information of each pixel dot in a to-be-predicted frame next to the at least one frame as outputted from the first neural network.

Figure 7:
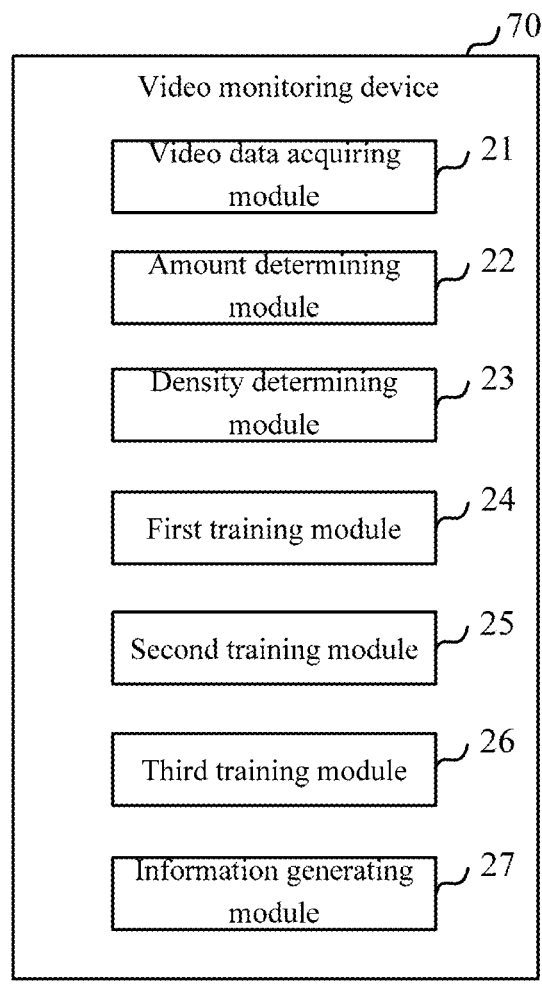
FIG. 7 is a functional block diagram further illustrating the video monitoring device according to an embodiment of the present disclosure.

FIG. 7 is a functional block diagram further illustrating the video monitoring device according to an embodiment of the present disclosure. In comparison to the video monitoring device 20 described above with reference to FIG. 2, the video monitoring device 70 shown in FIG. 7 further comprises a first training module 24, a second training module 25, a third training module 26, and an information generating module 27, in addition to the video data acquiring module 21, the amount determining module 22, and the density determining module 23. Repeated descriptions of the video data acquiring module 21, the amount determining module 22, and the density determining module 23 are omitted here.

The first training module 24 is for training in advance the first neural network that for determining object amount information of each pixel dot in at least one frame in video. Training processing of the first training module 24 adopts the flow described with reference to FIG. 3, repeated descriptions are omitted here.

The second training module 25 is for training in advance the second neural network that for determining object density information of each pixel dot in at least one frame in video. Training processing of the second training module 25 adopts the flow described with reference to FIG. 5, repeated descriptions are omitted here.

The third training module 26 is for training the second neural network for determining object density information of each pixel dot in a to-be-predicted frame next to the at least one frame as outputted from the first neural network. Training processing of the second training module 26 adopts the flow described with reference to FIG. 6, repeated descriptions are omitted here.

The information generation module 27 generates alert information when the object density information of the at least one frame or the to-be-predicted frame next to the at least one frame indicates that an object density exceeds a predetermined threshold. By configuring the information generating module 27, when the object density information of the at least one frame or object density information of the to-be-predicted frame next to the at least one frame at any moment is larger than the predetermined threshold that is set in advance, it is displayed that an object density in the scene is too large is too large, there is a risk of occurrence of dangerous accidents such as stampede, then alert information is generated.

Figure 8:
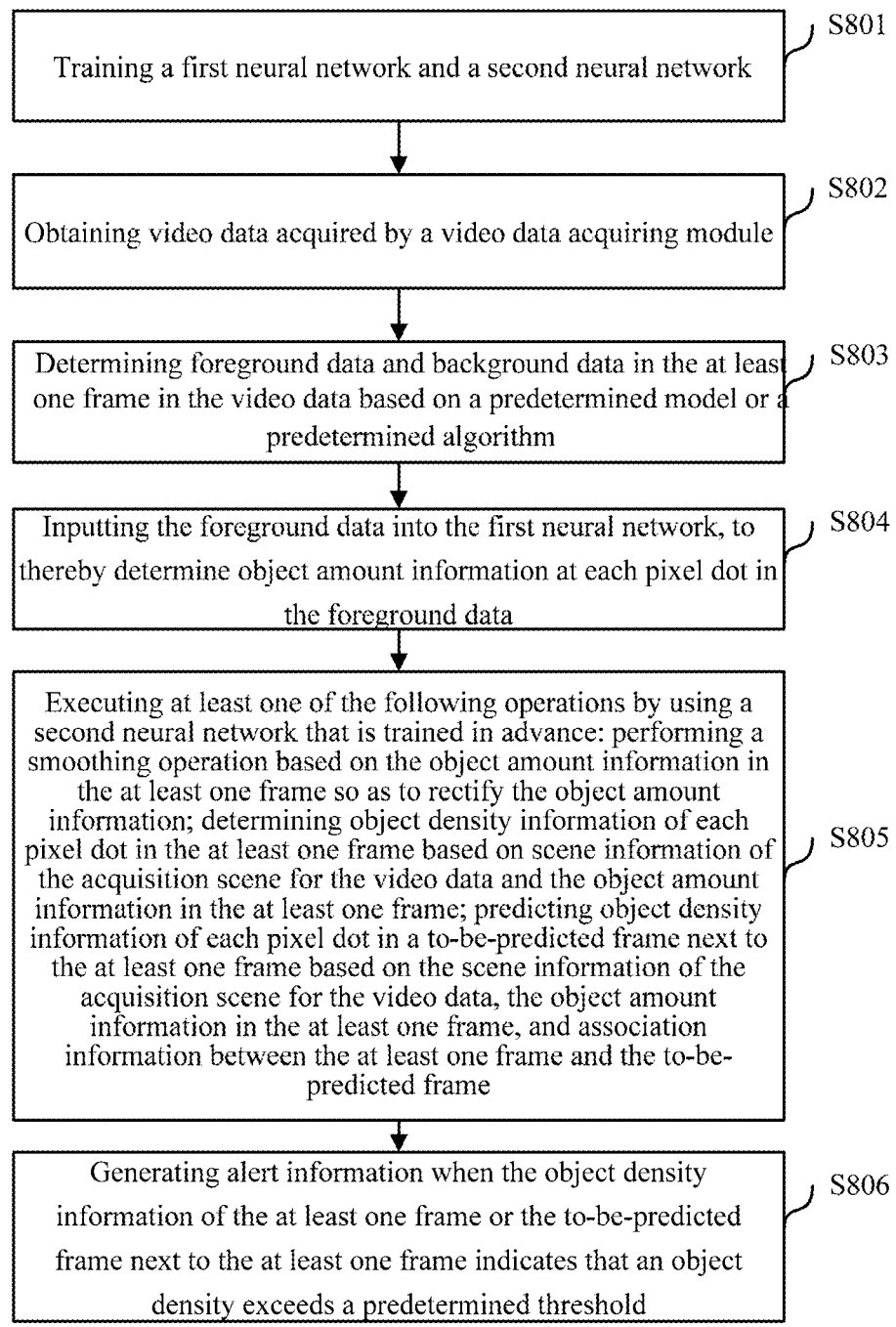
FIG. 8 is a flowchart further illustrating the video monitoring method according to an embodiment of the present disclosure.

FIG. 8 is a flowchart further illustrating the video monitoring method according to an embodiment of the present disclosure. The video monitoring method shown in FIG. 8 may be executed by the video monitoring device described above with reference to FIG. 7. Specifically, the video monitoring method according to an embodiment of the present disclosure comprises the following steps.

In step S801, a first neural network and a second neural network are trained. In an embodiment of the present disclosure, the first neural network and the second neural network may be trained by the first training module 24, the second training module 25, and the third training module 26 by using the training processing flows described with reference to FIGS. 3, 5, and 6, respectively. Thereafter, the processing proceeds to step S802.

In step S802, video data acquired by a video data acquiring module is obtained. Processing of step S802 is the same as step S201 described above with reference to FIG. 2, repeated descriptions are omitted here. Hereafter, the processing proceeds to step S803.

In step S803, foreground data and background data in the at least one frame in the video data are determined based on a predetermined model or a predetermined algorithm. In an embodiment of the present disclosure, after inputting at least one frame in the video data into the first neural network that is trained in advance, foreground data and background data in the at least one frame may be determined based on a predetermined model or a predetermined algorithm. For example, probability estimation may be performed on each pixel dot in a region being monitored based on a predetermined model, to obtain a probability model for each pixel dot. In an embodiment of the present disclosure, a Multi-Gaussian model is used to perform probability estimation on a single pixel dot, and with this model, foreground data and background data are determined for the acquired video data. After a scene for being monitored is configured, the probability model is a probability that the video data is the background data. Since background is relatively fixed, foreground is arbitrary, thus features extracted from pixels that are different from the background data are the foreground data. In a case where the video data includes depth information, foreground data and background data in the at least one frame may be determined based on a predetermined algorithm. Specifically, the predetermined algorithm includes acquiring a depth information difference between current pixel information of each pixel dot of the video data and corresponding background depth information, determining a region that includes pixel dots whose depth information difference is larger than a first predetermined threshold as a foreground candidate region, and performing median filtering on video data in the foreground candidate region to obtain video data of a foreground region for monitoring. Hereafter, the processing proceeds to step S804.

Processings of step S804 and step S805 are the same as step S102 and step S103 described above with reference to FIG. 2, respectively, repeated descriptions are omitted here. Hereafter, the processing proceeds to step S806.

In step S806, alert information is generated when the object density information of the at least one frame or the to-be-predicted frame next to the at least one frame indicates that an object density exceeds a predetermined threshold.

Figure 9:
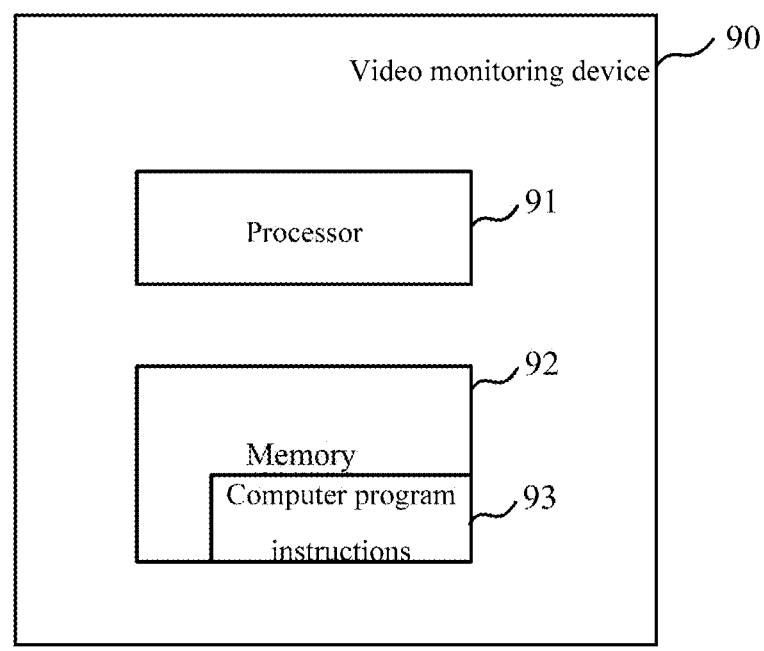
FIG. 9 is a schematic block diagram illustrating the video monitoring device according to an embodiment of the present disclosure.

FIG. 9 is a schematic block diagram illustrating the video monitoring device according to an embodiment of the present disclosure. As shown in FIG. 9, the video monitoring device 90 according to an embodiment of the present disclosure comprises a processor 91, a memory 92, and computer program instructions 93 stored in the memory 92.

The computer program instructions 93 can achieve functions of respective functional modules of the video monitoring device according to an embodiment of the present disclosure and/or execute respective steps of the video monitoring method according to an embodiment of the present disclosure, when being run by the processor 91.

Specifically, the computer program instructions 93 are configured to cause the video monitoring device 90 to execute the following steps when being run by the processor 91: obtaining video data acquired by a video data acquiring module in an acquisition scene; inputting at least one frame in the video data into a first neural network that is trained in advance, so as to determine object amount information of each pixel dot in the at least one frame; and executing at least one of the following operations by using a second neural network that is trained in advance: performing a smoothing operation based on the object amount information in the at least one frame so as to rectify the object amount information; determining object density information of each pixel dot in the at least one frame based on scene information of the acquisition scene for the video data and the object amount information in the at least one frame; predicting object density information of each pixel dot in a to-be-predicted frame that is next to the at least one frame based on the scene information of the acquisition scene for the video data, the object amount information in the at least one frame, and temporal relationship information between the at least one frame and the to-be-predicted frame.

In addition, the computer program instructions 93 are configured to cause the video monitoring device 90 to execute the following steps when being run by the processor 91: training the first neural network, wherein training the first neural network comprises: as for at least one frame in video data in each acquisition scene among a plurality of acquisition scenes, marking training objects as existed in the at least one frame by using a marking box with a predetermined shape, marked video data being regarded as first training data, a concentration of each pixel dot in the first training data indicating an amount of training objects as existed at each pixel dot, inputting each frame of the first training data into a convolution neural network, outputting an amount of the training objects at each pixel dot in each frame of the first training data; and calculating a first loss function based on an amount of the outputted training objects and an amount of the marked training objects, and adjusting parameters of the convolution neural network according to the first loss function so as to obtain the first neural network that is trained.

In addition, the computer program instructions 93 are configured to cause the video monitoring device 90 to execute the following steps when being run by the processor 91: training the second neural network, wherein training the second neural network comprises: as for at least one frame in video data in each acquisition scene among a plurality of acquisition scenes, regarding video data in which an amount of training objects as existed in the at least one frame is marked as second training data, marking a density of training objects of each pixel dot in the second training data according to scene information of each acquisition scene; inputting each frame of the second training data into the second neural network, and outputting a density of training objects of each pixel dot in each frame of the second training data according to an amount of training objects at each pixel dot in a previous frame before each frame and the scene information of each acquisition scene; calculating a second loss function according to a density of training objects outputted in each frame and a density of marked training objects in a corresponding frame in the second training data; and adjusting parameters of the second neural network according to the second loss function, so as to obtain the second neural network that is trained.

In addition, the computer program instructions 93 are configured to cause the video monitoring device 90 to execute the following steps when being run by the processor 91: training the second neural network, wherein training the second neural network comprises: as for at least one frame in video data in each acquisition scene among a plurality of acquisition scenes, regarding video data in which an amount of training objects as existed in the at least one frame is marked as third training data, marking a density of training objects of each pixel dot in the third training data according to scene information of each acquisition scene; inputting each frame of the third training data into the second neural network, and outputting a density of training objects of each pixel dot in a to-be-predicted frame next to each frame of the third training data according to an amount of training objects at each pixel dot in a previous frame before each frame and the scene information of each acquisition scene, calculating a third loss function according to a density of training objects outputted for each pixel dot in the to-be-predicted frame and a density of marked training objects in a corresponding frame in the third training data; and adjusting parameters of the second neural network according to the third loss function, so as to obtain the second neural network that is trained.

In addition, the computer program instructions 93 are configured to cause the video monitoring device 90 to execute the following steps when being run by the processor 91: determining foreground data and background data in the at least one frame in the video data based on a predetermined model or a predetermined algorithm; and inputting the foreground data into the first neural network, to thereby determine object amount information at each pixel dot in the foreground data.

In addition, the computer program instructions 93 are configured to cause the video monitoring device 90 to execute the following steps when being run by the processor 91: generating alert information when the object density information of the at least one frame or the to-be-predicted frame next to the at least one frame indicates that an object density exceeds a predetermined threshold.

Respective modules in the video monitoring device according to an embodiment of the present disclosure may be implemented by that the processor in the video monitoring device according to an embodiment of the present disclosure run the computer program instructions stored in the memory, or may be implemented by that the computer program instructions stored in the computer-readable storage medium of the computer program product according to an embodiment of the present disclosure are run by a computer.

The computer-readable storage medium may for example include a memory card of a smart phone, a storage unit of a tablet computer, a hard disk of a personal computer, a random access memory (RAM), a read only memory (ROM), an erasable programmable read-only memory (EPROM), a portable compact disc read-only memory (CD-ROM), a USB memory, or a combination of any the aforesaid storage mediums.

According to yet another embodiment of the present disclosure, there is provided a computer program product, comprising a computer-readable medium on which computer program instructions configured to execute the following steps when being run by a computer are stored:

obtaining video data acquired by a video data acquiring module in an acquisition scene; inputting at least one frame in the video data into a first neural network that is trained in advance, so as to determine object amount information of each pixel dot in the at least one frame; and executing at least one of the following operations by using a second neural network that is trained in advance: performing a smoothing operation based on the object amount information in the at least one frame so as to rectify the object amount information; determining object density information of each pixel dot in the at least one frame based on scene information of the acquisition scene for the video data and the object amount information in the at least one frame; predicting object density information of each pixel dot in a to-be-predicted frame that is next to the at least one frame based on the scene information of the acquisition scene for the video data, the object amount information in the at least one frame, and temporal relationship information between the at least one frame and the to-be-predicted frame.

Exemplary embodiments of the present disclosure as described in detail in the above are merely illustrative, rather than limitative. However, those skilled in the art should understand that, various modifications, combinations or sub-combinations may be made to these embodiments without departing from the principles and spirits of the present disclosure, and such modifications are intended to fall within the scope of the present disclosure.

What is claimed is:

1. A video monitoring method, comprising:
   obtaining video data acquired by a video data acquiring module;
   inputting at least one frame in the video data into a first neural network that is trained in advance, so as to determine object amount information of each pixel dot in the at least one frame; and
   executing at least one of the following operations by using a second neural network that is trained in advance:
   performing a smoothing operation based on the object amount information in the at least one frame so as to rectify the object amount information;
   determining object density information of each pixel dot in the at least one frame based on scene information of the acquisition scene for the video data and the object amount information in the at least one frame;
   predicting object density information of each pixel dot in a to-be-predicted frame next to the at least one frame based on the scene information of the acquisition scene for the video data, the object amount information in the at least one frame, and association information between the at least one frame and the to-be-predicted frame,
   wherein determining object density information of each pixel dot in the at least one frame based on scene information of the acquisition scene for the video data and the object amount information in the at least one frame comprises:
   multiplying the object amount information in each pixel dot with the scene information of the acquisition scene where each pixel dot resides to obtain the object density information of each pixel dot.

2. The video monitoring method according to claim 1, further comprising training the first neural network,
   wherein training the first neural network comprises:
   as for at least one frame in video data in each acquisition scene among a plurality of acquisition scenes, marking training objects as existed in the at least one frame by using a marking box with a predetermined shape, marked video data being regarded as first training data, a concentration of each pixel dot in the first training data indicating an amount of training objects as existed at each pixel dot,
   inputting each frame of the first training data into a convolution neural network, outputting an amount of the training objects at each pixel dot in each frame of the first training data; and
   calculating a first loss function based on an amount of the outputted training objects and an amount of the marked training objects, and adjusting parameters of the convolution neural network according to the first loss function so as to obtain the first neural network that is trained.

3. The video monitoring method according to claim 1, further comprising training the second neural network,
   wherein training the second neural network comprises:
   as for at least one frame in video data in each acquisition scene among a plurality of acquisition scenes, regarding video data in which an amount of training objects as existed in the at least one frame is marked as second training data, marking a density of training objects of each pixel dot in the second training data according to scene information of each acquisition scene;
   inputting each frame of the second training data into the second neural network, and outputting a density of training objects of each pixel dot in each frame of the second training data according to an amount of training objects at each pixel dot in a previous frame before each frame and the scene information of each acquisition scene;

calculating a second loss function according to a density of training objects outputted in each frame and a density of marked training objects in a corresponding frame in the second training data; and adjusting parameters of the second neural network according to the second loss function, so as to obtain the second neural network that is trained.

4. The video monitoring method according to claim 1, further comprising training the second neural network, wherein training the second neural network comprises:

as for at least one frame in video data in each acquisition scene among a plurality of acquisition scenes, regarding video data in which an amount of training objects as existed in the at least one frame is marked as third training data, marking a density of training objects of each pixel dot in the third training data according to scene information of each acquisition scene;

inputting each frame of the third training data into the second neural network, and outputting a density of training objects of each pixel dot in a to-be-predicted frame next to each frame of the third training data according to an amount of training objects at each pixel dot in a previous frame before each frame and the scene information of each acquisition scene, calculating a third loss function according to a density of training objects outputted for each pixel dot in the to-be-predicted frame and a density of marked training objects in a corresponding frame in the third training data; and adjusting parameters of the second neural network according to the third loss function, so as to obtain the second neural network that is trained.

5. The video monitoring method according to claim 1, wherein inputting at least one frame in the video data into a first neural network that is trained in advance, so as to determine object amount information of each pixel dot in the at least one frame comprises:

determining foreground data and background data in the at least one frame in the video data based on a predetermined model or a predetermined algorithm; and inputting the foreground data into the first neural network, to thereby determine object amount information at each pixel dot in the foreground data.

6. The video monitoring method according to claim 1, wherein the at least one frame is all of image frames in the video data; or, the at least one frame is parts of image frames in the video data, and when an amount of the at least one frame is larger than 3, a time interval between respective adjacent frames is equal.

7. The video monitoring method according to claim 1, wherein the object amount information in the at least one frame, based on which the operation of determining object density information of each pixel dot in the at least one frame is performed, is rectified object amount information obtained by performing a smoothing operation;

and/or the object amount information in the at least one frame, based on which the operation of predicting object density information of each pixel dot in the to-be-predicted frame is performed, is rectified object amount information obtained by performing a smoothing operation.

8. The video monitoring method according to claim 1, further comprising:

generating alert information when the object density information of the at least one frame or the to-be-predicted frame next to the at least one frame indicates that an object density exceeds a predetermined threshold.

9. A video monitoring device, comprising:

a video data acquiring module for acquiring video data in an acquisition scene;

an amount determining module for inputting at least one frame in the video data into a first neural network that is trained in advance, so as to determine object amount information of each pixel dot in the at least one frame; and a density determining module for executing at least one of the following operations by using a second neural network that is trained in advance:

performing a smoothing operation based on the object amount information in the at least one frame so as to rectify the object amount information;

determining object density information of each pixel dot in the at least one frame based on scene information of the acquisition scene for the video data and the object amount information in the at least one frame; and predicting object density information of each pixel dot in a to-be-predicted frame next to the at least one frame based on the scene information of the acquisition scene for the video data, the object amount information in the at least one frame, and association information between the at least one frame and the to-be-predicted frame, wherein determining object density information of each pixel dot in the at least one frame based on scene information of the acquisition scene for the video data and the object amount information in the at least one frame comprises:

multiplying the object amount information in each pixel dot with the scene information of the acquisition scene where each pixel dot resides to obtain the object density information of each pixel dot.

10. The video monitoring device according to claim 9, further comprising:

a first training module for training the first neural network in advance, wherein as for at least one frame in video data in each acquisition scene among a plurality of acquisition scenes, training objects as existed in the at least one frame are marked by using a marking box with a predetermined shape, marked video data is regarded as first training data, a concentration of each pixel dot in the first training data indicates an amount of training objects as existed at each pixel dot, the first training module inputs each frame of the first training data into a convolution neural network, an amount of the training objects at each pixel dot in each frame of the first training data is outputted;

the first training module calculates a first loss function based on an amount of the outputted training objects and an amount of the marked training objects, and adjusts parameters of the convolution neural network according to the first loss function so as to obtain the first neural network that is trained.

11. The video monitoring device according to claim 9, further comprising:
a second training module for training the second neural network, wherein
as for at least one frame in video data in each acquisition scene among a plurality of acquisition scenes, video data in which an amount of training objects as existed in the at least one frame is marked is regarded as second training data, a density of each pixel dot in the second training data is marked according to scene information of each acquisition scene,
the second training module inputs each frame of the second training data into the second neural network, and a density of training objects of each pixel dot in each frame of the second training data is outputted according to an amount of training objects at each pixel dot in a previous frame before each frame and the scene information of each acquisition scene,
the second training module calculates a second loss function according to a density of training objects outputted in each frame and a density of marked training objects in a corresponding frame in the second training data, and adjusts parameters of the second neural network according to the second loss function, so as to obtain the second neural network that is trained.

12. The video monitoring device according to claim 9, wherein the amount determining module determines foreground data and background data in the at least one frame in the video data based on a predetermined model or a predetermined algorithm, and inputs the foreground data into the first neural network, to thereby determine object amount information at each pixel dot in the foreground data.

13. The video monitoring device according to claim 9, wherein the at least one frame is all of image frames in the video data; or, the at least one frame is parts of image frames in the video data, and when an amount of the at least one frame is larger than 3, a time interval between respective adjacent frames is equal.

14. The video monitoring device according to claim 9, wherein the object amount information in the at least one frame based on which the density determining module performs the operation of determining object density information of each pixel dot in the at least one frame, is rectified object amount information obtained by performing a smoothing operation;
and/or the object amount information in the at least one frame based on which the density determining module performs the operation of predicting object density information of each pixel dot in the to-be-predicted frame, is rectified object amount information obtained by performing a smoothing operation.

15. The video monitoring device according to claim 9, further comprising:
an information generating module for generating alert information when the object density information of the at least one frame or the to-be-predicted frame next to the at least one frame indicates that an object density exceeds a predetermined threshold.

16. A video monitoring device, comprising:
a processor;
a memory; and
computer program instructions stored in the memory and configured to execute the following steps when being run by the processor:
obtaining video data acquired by a video data acquiring module;
inputting at least one frame in the video data into a first neural network that is trained in advance, so as to determine object amount information of each pixel dot in the at least one frame; and
executing at least one of the following operations by using a second neural network that is trained in advance:
performing a smoothing operation based on the object amount information in the at least one frame so as to rectify the object amount information;
determining object density information of each pixel dot in the at least one frame based on scene information of the acquisition scene for the video data and the object amount information in the at least one frame;
predicting object density information of each pixel dot in a to-be-predicted frame next to the at least one frame based on the scene information of the acquisition scene for the video data, the object amount information in the at least one frame, and association information between the at least one frame and the to-be-predicted frame,
wherein determining object density information of each pixel dot in the at least one frame based on scene information of the acquisition scene for the video data and the object amount information in the at least one frame comprises:
multiplying the object amount information in each pixel dot with the scene information of the acquisition scene where each pixel dot resides to obtain the object density information of each pixel dot.

17. The video monitoring device according to claim 16, wherein the step of inputting at least one frame in the video data into a first neural network that is trained in advance, so as to determine object amount information of each pixel dot in the at least one frame executed when the computer program instructions are run by the processor comprises:
determining foreground data and background data in the at least one frame in the video data based on a predetermined model or a predetermined algorithm; and
inputting the foreground data into the first neural network, to thereby determine object amount information at each pixel dot in the foreground data.

18. The video monitoring device according to claim 16, wherein the at least one frame is all of image frames in the video data; or, the at least one frame is parts of image frames in the video data, and when an amount of the at least one frame is larger than 3, a time interval between respective adjacent frames is equal.

19. The video monitoring device according to claim 16, wherein the object amount information in the at least one frame, based on which the operation of determining object density information of each pixel dot in the at least one frame is performed, is rectified object amount information obtained by performing a smoothing operation;
and/or the object amount information in the at least one frame, based on which the operation of predicting object density information of each pixel dot in the to-be-predicted frame is performed, is rectified object amount information obtained by performing a smoothing operation.

20. The video monitoring device according to claim 16, wherein the following step is further executed when the computer program instructions are run by the processor:
generating alert information when the object density information of the at least one frame or the to-be-predicted frame next to the at least one frame indicates that an object density exceeds a predetermined threshold.

* * * * *